Patented Aug. 30, 1932

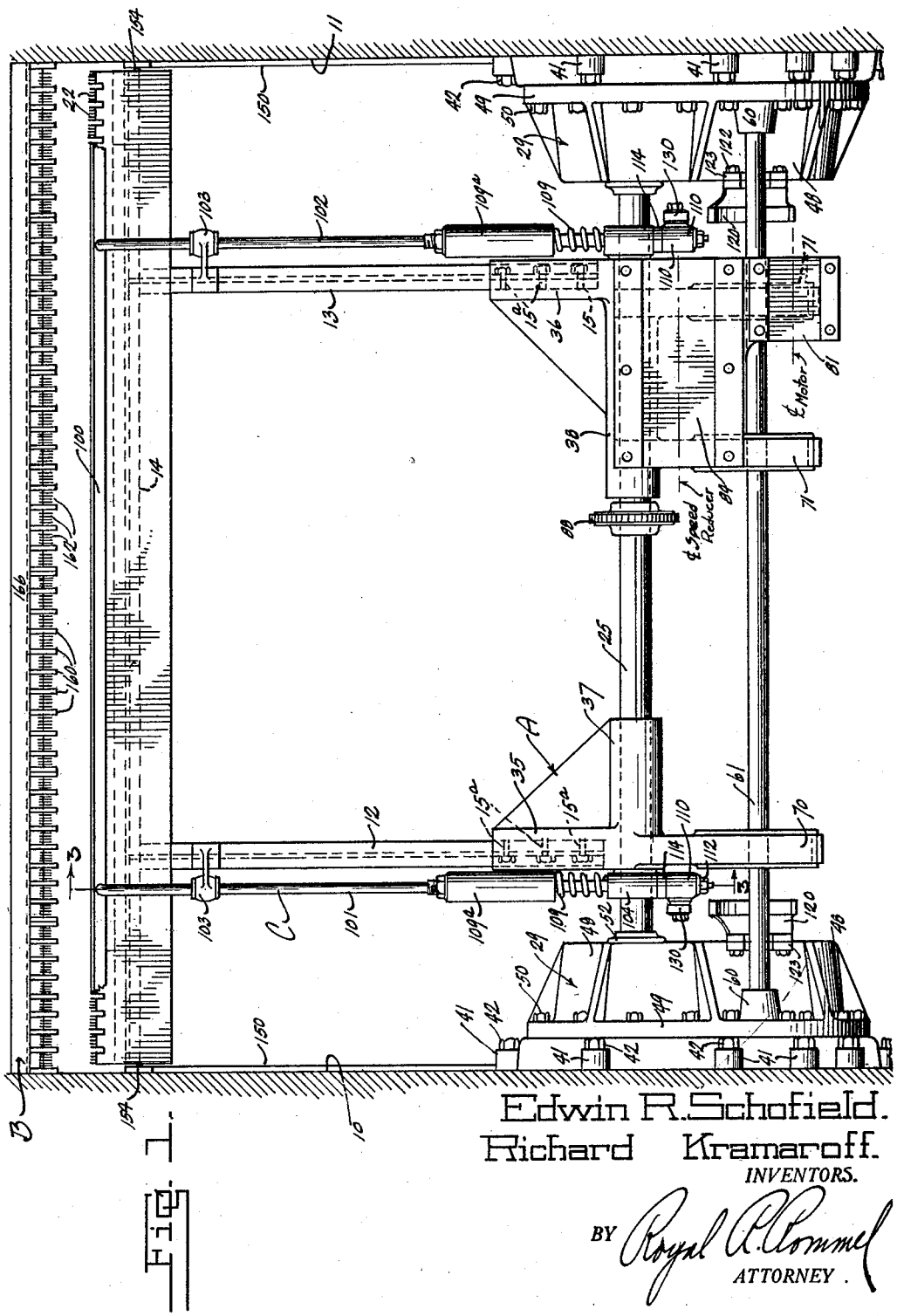

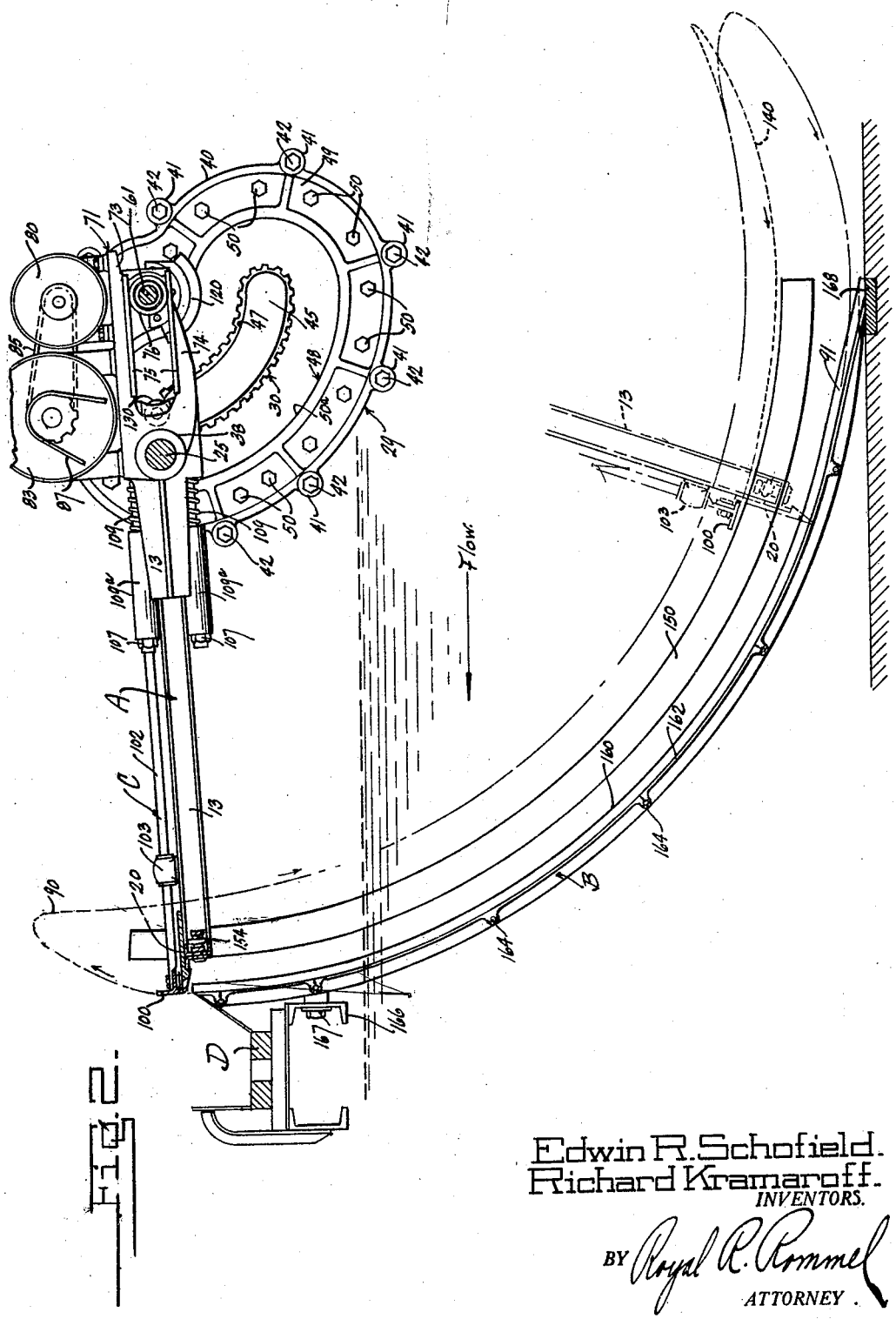

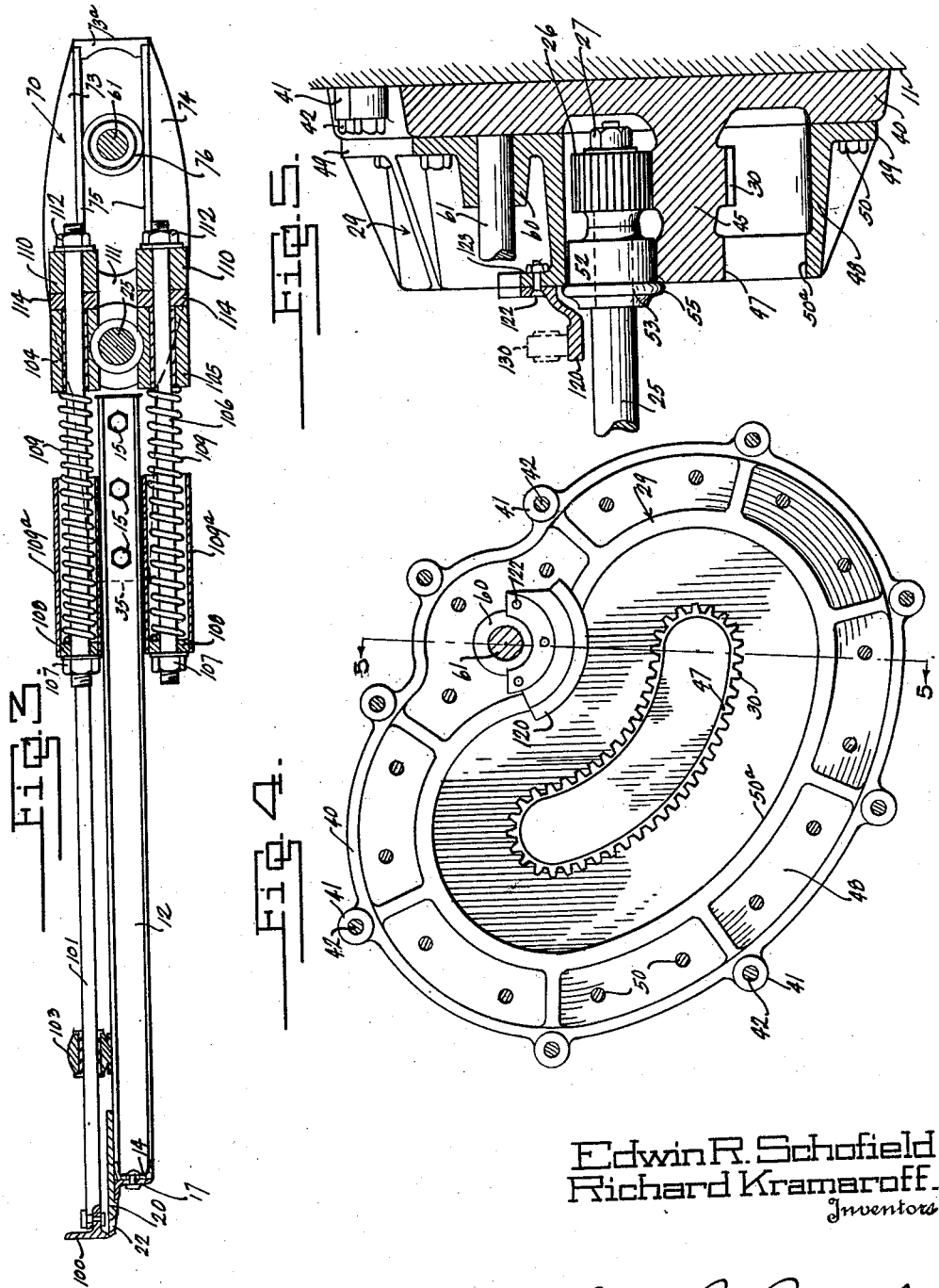

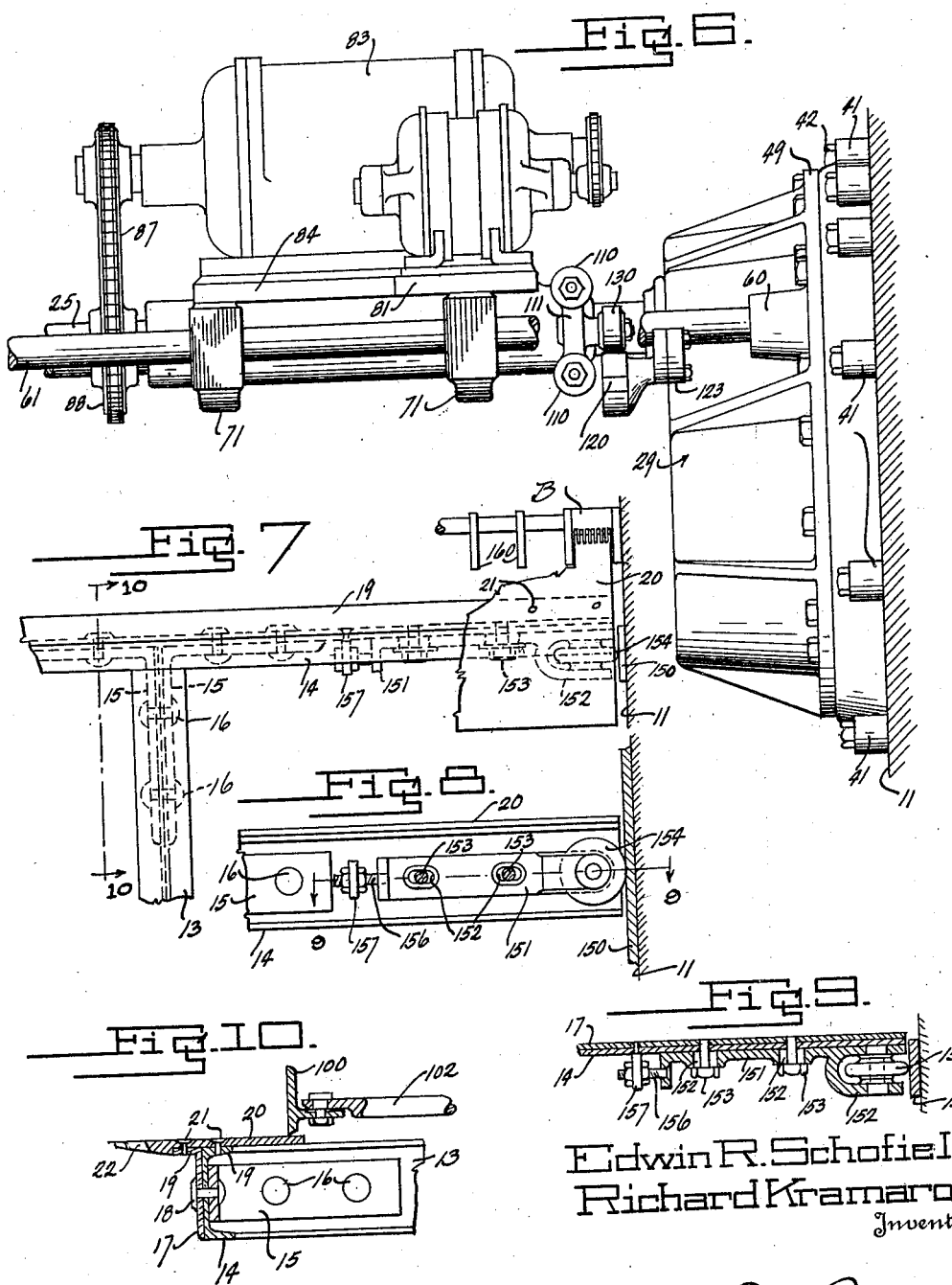

1,874,125

UNITED STATES PATENT OFFICE

EDWIN R. SCHOFIELD AND RICHARD KRAMAROFF, OF PHILADELPHIA, PENNSYLVANIA

RECIPROCAL RAKE APPARATUS

Application filed December 26, 1929. Serial No. 416,608.

This invention relates to improvements in cleaning apparatus particularly well adapted for the scraping of detritus and other collections from screens through which flowing bodies of liquid pass.

A further object of this invention is the provision of an improved cleaner embodying some of the characteristics of the cleaning apparatus set forth in our United States application for patent, Serial No. 318,227, filed November 9, 1928; but embodying improvements thereover in the provision of improved operating means for moving the raking apparatus in relation to a screen.

A further object of this invention is the provision of a rake adapted for general utility, but particularly well adapted to be used for the purpose of raking detritus from collecting screens, having means to cause the same to operate with a reciprocal motion with respect to the screen.

A further object of this invention is the provision of an improved oscillating type of collecting rake.

A further object of this invention is the provision of an improved rake structure provided with means to give the same a reciprocal operating movement in combination with automatically operated detritus ejecting means associated therewith.

Other objects and advantages of this invention will be apparent during the course of the following detailed description.

In the accompanying drawings, forming a part of this specification, and wherein similar reference characters designate corresponding parts throughout the several views.

Figure 1 is a plan view of the improved rake, showing the operating parts thereof as they would appear at the top of movement of the raking head, in spaced relation with respect to a screen cooperatively associated therewith.

Figure 2 is a sectional view taken through the improved rake structure, frame, and operating mechanism, showing the relation of parts, and the relation which the rake head bears in its operating movement with respect to a detritus collecting screen.

Figure 3 is a sectional view taken substantially on the line 3—3 of Figure 1, showing more particularly detritus ejecting mechanism associated with the rake frame and rake head.

Figure 4 is a side elevation of one of the side supporting bases of the frame, showing the relation of the parts thereof, which include a curvilinear rack; the mounting and connecting bolts of this base being shown in section.

Figure 5 is a sectional view of the base of Figure 4; the view being taken substantially on the line 5—5 of Figure 4, and in addition showing the relation which an operating pinion has with respect to the base and rack parts.

Figure 6 is a fragmentary view showing the relation of the rake frame at one of the side mounting bases; the frame showing the mounting thereon of the operating motor and speed reducing mechanism.

Figure 7 is a fragmentary view showing the relation of the structural details of the raking head or collector end of the frame.

Figure 8 is a fragmentary elevation showing means for guiding the raking or collecting end of the rake, in a stable relation, to prevent vibration and eccentric motion thereof.

Figure 9 is a section view taken substantially on the line 9—9 of Figure 8.

Figure 10 is a sectional view taken substantially on the line 10—10 of Figure 7.

In the drawings, wherein for the purpose of illustration is shown only a preferred embodiment of the invention, the letter A may generally designate the improved rake structure, adapted to cooperatively associate with a screen structure B for the removal and ejection of detritus with respect thereto.

The screen B may partake of the general characteristics of the screen of our above mentioned co-pending application, or it may be of the combination type of coarse and fine screen set forth in my co-pending application, Serial No. 416609 filed December 6, 1929, or it may be of any other type of screen desired, so far as the operating characteristics of the rake frame are concerned. The screen B may be positioned in any relation, but in the preferred instance it is positioned transversely across a channel between opposite side walls 10 and 11, as shown in Figure 1 of the drawings, and through which a body of water or other fluid flows, for the screening of any solid constituent or deposit therefrom.

Referring to the improved cleaner A, the same preferably includes a bodily movable frame portion consisting of a pair of relatively spaced parallel supporting arms 12 and 13, which in the preferred instance are beams of I-section, and the free ends of which support a channel beam 14, which extends practically the entire width of the channel through which the liquid passes, and which, as shown in Figures 7 and 10 of the drawings, is secured to the free ends of the arms 12 and 13, by angle clips 15, riveted thereto, as shown at 16. On the forward face of the channel 14, is disposed a reinforcing angle 17, riveted as at 18 therewith. This is the general construction set forth in the above first mentioned application, and provides transverse supporting flanges 19 to which a raking head, plate, or collecting member 20 is secured as at 21, shown in Figure 10. This collecting head 20 is provided with teeth 22 along the fore edge thereof, defining a comb-like structure adapted to cooperate with the bars of the screen B in a manner more specifically detailed in my application, Serial No. 416,609, above mentioned.

A suitable shaft 25 is provided as a part of the frame, which at each end thereof is provided with a gear or pinion 26, fixedly keyed thereon, and held in position by means of a nut 27 screwed on a reduced end of the shaft 25, as shown in Figure 5. These pinions 26 intermesh and travel over suitable racks 30 formed as a part of the bases or mounting pieces 29, secured to the opposite walls 10 and 11 of the foundation structure.

The arms 12 and 13 are detachably bolted as at 15ª, shown in Figures 1 and 3 of the drawings, in suitable sockets provided in the sides of extensions 35 and 36 formed integral or otherwise rigid with bearing sleeves 37 and 38 respectively oscillatively mounted upon the shaft 25, on said shaft between the castings or supporting structure 29. These bearing sleeves 37 and 38 extend inwardly between and transverse to the arms 12 and 13, and enable the frame structure comprising the arms 12 and 13 and the collecting or rake head to oscillate about the axis of the shaft 25.

Referring more specifically at this time to the structure of the supports 29, the same each includes a base plate 40, shown best in Figure 5, which is peripherally provided with a plurality of apertured lugs 41, through which bolts 42 may be extended for the purpose of bolting the structure 29 to the wall 10 or the wall 11, as the case may be. These base plates 40 are provided on the channel facing surfaces thereof with curvilinear extensions 45 on which the teeth, defining the rack 30 above mentioned are peripherally located in forwardly spaced relation from the channel facing surface of the plate 40. On the extension 45, at the free end thereof, beyond the plane of the rack 30, is formed a track 47, preferably exactly paralleling the pitch line of the rack teeth; which cooperates in holding the pinion 26 on the teeth of the rack 30, as will be subsequently mentioned. In addition to the above parts, the structure 29 also includes a metal casting 48, outwardly flanged at 49 and bolted at 50 on the face of the base plate 40, as shown in Figure 5. From the bolting flange 49 the casting 48 projects towards the channel, in a convergent relation, following the contour of the rack 30, and at its free end it is provided with an inwardly raised track 50ª, in the same plane as the track 47 above mentioned, and spaced therefrom a predetermined distance to provide an annular track-way or passageway between the track surfaces 47 and 50ª, within which a guard roller 52 rides; the same being rotatably mounted upon a reduced end 53 of the shaft 25, as shown in Figure 5, for the purpose of preventing the teeth of the pinions 26 from disengaging with the teeth of the rack 30, as can readily be understood from Figure 5. There is just sufficient clearance between the outer periphery of the roller 52 and the track surfaces 47 and 50ª to permit of the rolling of the guard 52, to accomplish this purpose mentioned. It is to be noted that there is a guide flange 55 provided on the roller 52, which is of greater diameter than the passageway between the track surfaces 47 and 50ª, and engages the outer face of the extension 45 and the outer edge of the casting 48 during the travel of the pinion about the rack.

The casting portions 48 of each of the supporting structures 29 are provided with bearing extensions 60 thereon, within which the ends of a fulcrum shaft 61 engage at a location rearwardly of the shaft 25, with respect to the screen B.

The rake frame proper is preferably provided with some means by which to fulcrum the same on the shaft 61 during the travel of the pinion about the rack 30, for the purpose of moving the collecting head of the rake over the screen. One embodiment of such means is shown in the drawings, and consists in the provision of bifurcated extensions on the bearings 37 and 38, having a slidable pivot fulcrum connection on the shaft 61. One of such extensions, shown at 70 in Figure 1 of the drawings, is provided upon the bearing 37 of the arm 12, and the bearing 38 connected with the arm 13 of the rake frame is preferably provided with a pair of such bifurcated extensions. The bifurcated extensions 70 and 71, to all intents and purposes, are of similar construction, consisting, as shown more particularly in Figure 2, of a pair of spaced arms 73 and 74, having facing tracks 75 between an anti-friction bearing 76 operates; the latter being concentrically connected upon the shaft 61.

Means is provided, carried upon the oscillatory frame structure, to cause a rotation of the shaft 25, so that the pinions keyed therewith will rotate about the racks 30. This means consists in providing an electric motor 80, shown in Figure 2, and the center line of which is shown in Figure 1, which is mounted upon a pair of parallel strips of a platform structure 81 carried on the rear end of one of the fulcrum extensions 71. Inasmuch as the rake will have to be oscillated rather slowly over the screen, where its use is adaptable for the removal of detritus from liquid bodies, such as the screening of sewage and the like, it will be preferred to reduce the speed at which the shaft 25 is rotated. To this end speed reduction gearing or mechanism 83 is provided, shown in Figure 2, the center line of which is shown in Figure 1, mounted upon a suitable platform 84 secured upon the bearing 38 and its extension 71 above mentioned, as best shown in Figure 1. This speed reduction mechanism 83 is operatively connected to the motor 80 by an endless belt 85, which may be a sprocket chain, connected to suitable sprockets of the shafts of the motor and speed reducer. The speed reducing mechanism 83 has a sprocket or other connection 87 at its opposite end with a suitable sprocket or other wheel 88 keyed on the shaft 25.

With reference to the movement of the rake structure, it is quite apparent, upon rotation of the shaft 25, by the means above mentioned, that the pinions 26, keyed therewith, will move in meshing relation about the curvilinear rack 30. Inasmuch as the shaft 25 is rotatably fixed as to its axis, with respect to the rake frame consisting of the arms 12, 13; collecting head 20, and bearings 37 and 38, it follows that the collecting head will be arcuately moved. Bearing in mind that the extensions 70 and 71 of the rake frame have a sliding fulcrum upon the shaft 61, it follows that the comb or toothed raking or collecting head 20 will be moved with its teeth in meshing relation with the bars of the screen B during the interval that the pinions 26 travel over those portions of the racks which immediately face the screen B. Of course, to attain this result the screens B and the portion of the rack 30 over which the pinions ride to enable a meshing of the rake with the bars of the screen will be concentrically arranged, and preferably struck from the axis of the shaft 61 as a center. At the top of movement the pinions 21 commence to ride over the upper short arc of the rack, which draws the toothed end of the rake head in the path designated by the dot and dash lines 90 in Figure 2, and on its down movement the toothed end of the rake head will follow the dot and dash lines as shown in Figure 2, until the pinions mesh with the lower portions of the screen facing sides of the racks 30, and the teeth of the rake head 20 come into mesh with the bars of the screen at approximately the location 91 shown in Figure 2, and continue in mesh with the screen until the top of the screen is reached. Thus, it is seen that the rake structure has a reciprocal motion, which in the present instance is oscillatory. The fact that the rake structure on the upstroke over the screen is in mesh or other operating relation with the screen to remove detritus or other material therefrom, and that during the downstroke the rake structure is out of operating relation or mesh with the screen is very important, since thereby detritus or other foreign or constituents desired to be removed may be displaced in the most efficient manner from a flowing body of water, without unnecessary disturbance. An oscillatory screen of this type is of considerable advantage over the type of rotary screen set forth in my application above identified, in that considerable head-room is saved, and in cases where the screen is adaptable for use in the cleaning of detritus from sewage, the entire screen may be placed beneath a floor structure, for sanitary and other reasons.

It is of course within the contemplation of this invention that the reciprocal motion of the rake over a screen may be rectilinear instead of oscillatory, since it is entirely conceivable that instances may be desired wherein the rake should have a reciprocal movement over a straight bar screen. Of course in such instance the rake frame will not pivot about a fulcrum shaft, but will rather have some stabilizing pin and slot connection to guide the frame as it is moved by the pinion and rack mechanism over its rectilinear path.

In combination with my improved reciprocally operated rake structure, I provide automatically operated ejecting means for discharging detritus from the collecting head of the rake structure at the top of its movement over the screen B. This ejecting apparatus partakes of some of the characteristics of the ejecting and discharging apparatus set forth in my co-pending application, Serial No. 318,227, above mentioned. It differs therefrom in certain essential characteristics, however, due to the new type of operating mechanism. The ejector mechanism generally designated as C includes an ejector bar or head 100, of angle or other shape, operating over the shelf-like collecting head 20 for the discharge of collections therefrom. The ejector head 100 has connected therewith a pair of arms 101 and 102 longitudinally supported for reciprocation in suitable bearings 103 carried on the fore ends of the beams 12 and 13 adjacent the collecting head of the rake. Referring more particularly to the cross sectional view of Figure 3, the structure shown therein is provided for each of the arms 101 and 102, and consists in providing double ejecting springs and supports for each of the arms 101 and 102. At the opposite sides, preferably above and below the shaft 25, bearing sleeves 104 and 105 are provided; the upper sleeve 104 receiving the shaft 101 or shaft 102, as the case may be, and the lower sleeve 105 receiving reciprocably therethrough a supporting pin or shaft 106, as shown in Figure 3. These bearing sleeves 104 and 105 are of course cast or formed otherwise rigid with each of the frame bearings 37 and 38, and at the fore end of the arm 106 and intermediate the ends of the arm 101 or 102, as the case may be, the same are provided with nuts 107 adjustable thereon, forming abutments against which washers 108 abut. Springs 109 under compression are received on the shafts or arms 101, 102 and 106 between the abutments 108 and the ends of the bearing sleeves 104 and 105, and the purpose of which springs is of course to force the ejector forwardly. The rear ends of the arms 101 and 102, and the short arms or pins 106 therebelow extend through the apertured ends 110 of a cross connecting piece 111; the rear ends of the arms 101 and 102 and the shafts 106 therebelow being screw threaded and connected by adjustable nuts 112 to the portions 110, as shown in Figure 3. The action of the springs 109 is to urge the member 111 forwardly towards the springs until the apertured portions 110 thereof abut against yieldable buffing rings or pads 114, shown in Figure 3, which in turn abut against the rear ends of the sleeves 104 and 105, and defines the ejecting position of the cleaner or ejecting head 100, as shown in Figures 1 and 3 of the drawings.

Each of the supporting casting pieces 48 of the structure 29 is provided with an arcuate shaped cam 120, detachably bolted as at 122, shown in Figure 5, to a flange 123, and projecting inwardly below the shaft 61, and defining upwardly facing concaved cam trackways or surfaces, over which rollers 130, supported in an extending relation from the outer side of the pieces 111 at the rear end of the ejecting arms 101 and 102, operate. The relation of the rollers 130 to the arcuated cams 120 is shown in Figures 1, 2, 5 and 6 of the drawings, and as will be noted from Figure 2, as the pinion travels about the rack 30 the roller 130 will pass into positon above the cam 120, and as the pinion rotates about the cam facing side of the rack 30 the roller 130 will come into engagement with the upper concave side of the cam 120, and will remain there during the downward travel of the rake frame to assume an operative relation with the spring structure, causing a flexing of the springs 109, and holding said springs flexed during an upward riding of the rake head over the bars of the screen B, in the position in which the ejecting head 100 is shown in the dot and dash lines in Figure 2 of the drawings, until the rake head is at the top of the screen B, and at which time the rollers 130 will ride off the cams 120, and the springs 109 will quickly snap the ejector forwardly, and through the ejector head 100 force the detritus off the rake head onto the traveling collector D, shown in Figure 2, which may be of any approved type. At the end of its down movement the ejector head 100 is moved to an inoperative position through the means above described so that it will travel in the path of the dotted lines 140, shown in Figure 2, during the up collecting stroke of the rake structure over the screen.

In rake structures of this kind it sometimes becomes necessary, due to the depth of the liquid, and for other reasons, to make the frame relatively long, and for light operations the structure of the rate frame will sometimes admit of lateral movement or vibratory action. Under such circumstances, and if desired for any purpose, we may use rollers at the ends of the collecting head of the rake structure, operating in engagement with suitable trackways provided along the side walls of the channel structure. Thus, as shown in Figure 2, arcuated trackways 150 may be provided along opposite sides of the channel, on the walls 10 and 11, also shown in Figure 1. On the rake head, and more particularly the channel 14, are preferably provided a movable frame 151, having horizontally elongated slots 152 therein, through which pins 153, bolted to the rake head, as shown in Figure 9, may extend, in a relation which will permit of the longitudinal adjustment of the frame 151 along the rake head in the direction towards and away from the adjacent end of the rake head. This frame 151 is bifurcated at its ends 152ª and rotatably supports therein a roller 154 which projects sufficiently to ride over a trackway 150 as above mentioned. This frame 151 is held in proper adjustment by means of a screw 156 secured fixedly at the inner end of the frame 151, and adjusted by nuts operating thereon at opposite sides of a projecting support 157 rigid with the channel 14. The adjustment of the frames 151 at each end of the rake head permits the rollers to be properly adjusted for prevention of lateral vibration in the rake frame.

The screen B does not need detailing so far as this application is concerned. Briefly, it consists of a plurality of coarse bars 160, with fine screen bars 162 therebetween and in a protected relation therewith; all of them being supported upon suitable transverse bolts or shafts 164 extending transversely across the channel. A beam 166 secured at its ends in the walls 10 and 11 of the channel structure supports the upper end of the screen, as by means 167, and the lower ends of the bars of the screen rest in a suitable base plate 168.

Various changes in the shape, size, and arrangement of parts may be made to the form of invention herein shown and described, without departing from the spirit of the invention or the scope of the claims.

We claim:

1. In combination apparatus of the class described a screen for screening materials from liquid bodies, a rake structure including a collecting head, means for operatively moving the collecting head through an oscillatory movement less than full rotary movement in a reciprocal relation with respect to said screen with the collecting head operative on the screen during travel of the collecting rake in one direction and with the collecting head spaced inoperative from the screen during movement of the rake in an opposite direction, and ejecting means bodily carried by the rake for discharging detritus at the end of an operative collecting movement of the collecting head over said screen.

2. In apparatus of the class described a curved screen, a collecting rake operating over the screen, means for oscillating said collecting rake over said screen, and means for discharging detritus from the rake at the end of an operation over said screen, said last mentioned means having an ejecting head bodily carried for movement by and with said rake.

3. In a raking structure the combination of a rake frame including a raking portion, a curvilinear rack, a pinion rotatably mounted on a frame on an axis which is fixed with respect to the raking portion of the frame and meshing with said curvilinear rack, means for rotating the pinion for causing it to move around the rack, and means fulcruming the rake frame on a predetermined axis for causing the collecting end to move in a predetermined path.

4. In a raking structure the combination of a rake frame including a raking portion, a curvilinear rack, a pinion rotatably mounted on an axis which is fixed with respect to the raking portion of the frame and meshing with said curvilinear rack, means for rotating the pinion for causing it to move around the rack, means fulcruming the rake frame on a predetermined axis for causing the collecting end to move in a predetermined path, and ejecting means bodily carried by the rake frame.

5. In raking apparatus a rigid body frame having a raking head, a curvilinear rack, rotatable pinion means carried by the frame on an axis which is fixed with respect to the rake head and operating on the rack, means slidably fulcruming the frame, and means carried by the movable rake frame fixed with respect to the raking head for operating the pinion means and causing it to move about said curvilinear rack.

6. In a rake structure of the class described the combination of an elongated rake frame, means operatively and movably mounting the rake frame at an end thereof so that the opposite end may move in a raking action, means for preventnig lateral vibration at the raking end of the rake frame at opposite sides thereof, including stationary tracks at opposite sides of the rake frame and rollers carried by the rake frame at the opposite ends of the raking end of the frame with their axes arranged substantially at right angles with the length of the raking end of said frame and each roller extending peripherally beyond the adjacent end of the raking end in roller engagement with its adjacent track.

7. In a rake structure of the class described the combination of an elongated rake frame, means operatively and movably mounting the rake frame at an end thereof so that the opposite end may move in a raking action, means for preventing lateral vibration at the raking end of the rake frame at opposite sides thereof, including stationary tracks at opposite sides of the rake frame and rollers carried by the rake frame at the opposite ends of the raking end of the frame with their axes arranged substantially at right angles with the length of the raking end of said frame and each roller extending peripherally beyond the adjacent end of the raking end in roller engagement with its adjacent track, and means for adjusting said rollers toward or away from their respective tracks.

8. In apparatus of the class described a shiftable shaft, a detritus collecting frame oscillatively mounted upon the shiftable shaft with the shaft on a fixed axis relative to the frame, a curvilinear rack, a pinion on the shaft operating in meshing relation with said curvilinear rack, means for rotating said shaft to cause it and the frame to travel along the rack, a fixed shaft, and means carried by the frame slidably pivoting the frame in a fulcruming action on the fixed shaft.

9. In apparatus of the class described a shaft, a collecting frame oscillatively mounted upon the shaft, a curvilinear rack, a pinion on the shaft operating in meshing relation with said curvilinear rack, means for rotating said shaft, a fixed shaft, means carried by the frame slidably pivoting the frame in a fulcruming action on the fixed shaft, an ejector, spring means normally moving the ejector to an ejecting relation on said frame, a fixed cam, and means associated with the ejector operatively positioned with respect to the cam to cause a retraction of the spring means during a part movement of the frame and to ride off the cam for an ejecting action in a predetermined position.

10. The combination with a screen and a cleaning device therefor comprising a rake, supporting means for the rake, means for mechanically and positively imparting a substantially reciprocatory movement to said rake in the course of which it moves in one direction in proximity to said screen and returns in the opposite direction appropriately spaced from the screen, a discharge scraper bodily carried by the rake and movable over the rake for positive forcing of the detritus therefrom, and means for operating said scraper at a predetermined location in the path of reciprocatory movement of the rake for ejecting deposits from the rake.

11. In a rake structure for removing detritus and the like from liquids, the combination of a reciprocatory rake complete in itself for collecting detritus, means for mechanically and positively imparting a reciprocatory movement to said rake in the course of which it moves in one direction along a predetermined path and in an opposite direction along a predetermined path spaced from the first mentioned path, and a reciprocatory cleaner carried by the reciprocatory rake for travel therewith, including a head for contact with the collected detritus to eject it from the rake.

12. In a rake structure the combination of a support, a rake reciprocably carried on the support having means to collect rakings directly thereon, an ejector for the rake reciprocably carried bodily upon the reciprocatory rake and movable bodily with the reciprocatory action of the rake, and cam means for operating the ejector on the rake at a predetermined location in the reciprocatory travel of the rake for discharging collections from the rake.

13. In a self cleaning rake structure the combination with a screen, of a rake frame having a raking head thereon, supporting means for the rake frame, means for mechanically and positively imparting a substantially reciprocatory movement to said rake frame in the course of which the raking head moves in one direction in proximity to said screen and returns in the opposite direction appropriately spaced from the screen, and an ejector bodily carried by the rake frame including a portion movable over the raking head for ejecting collected deposits therefrom, said ejector including a roller, and a stationary cam positioned in the path of movement of the roller so that the latter will ride thereover during travel of the rake for operating said ejector.

14. In a rake structure the combination of a shaft, a collecting frame oscillatively mounted between its ends upon the shaft, a curvilinear rack having an endless series of teeth thereabout, a pinion on the shaft operating in meshing relation with the curvilinear rack, means fixedly mounted upon the collecting frame for rotating said shaft and its pinion so that the shaft will be caused to move with a shifting axis along a path in parallelism with the path of the rack teeth, a raking head fixed with the collecting frame at one end, the collecting frame at its other end at the opposite side of the axis of said shaft from the collecting head having an elongated slot therein, a shaft mounted upon a stationary and fixed axis, said collecting frame being fulcrumed in a slidably pivoted relation on said last mentioned shaft with said last mentioned shaft positioned in the slot of said collecting frame.

EDWIN R. SCHOFIELD.
RICHARD KRAMAROFF.